3,095,429
PROCESS FOR THE PREPARATION OF CRYSTALLINE DIGLYCIDYL ETHER OF BISPHENOL A

John C. Smith and William R. Bradshaw, Lake Jackson, Tex., Lionel M. Raff, Champaign, Ill., and Wilbur L. Bressler, Lake Jackson, Tex., assignors to The Dow Chemical Company, Midland, Mich., a corporation of Delaware
No Drawing. Filed May 19, 1959, Ser. No. 814,163
7 Claims. (Cl. 260—348)

This invention relates to crystalline diglycidyl ether of bisphenol A and molding compositions produced therewith.

The diglycidyl ether of bisphenol A having the structural formula

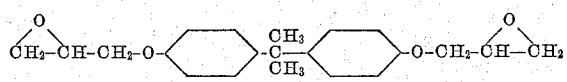

(hereinafter called DEBA) is described in the literature as being a pale or dark yellow very viscous liquid which exhibits very little tendency to crystallize. The fact that the product does not crystallize can be attributed to impurities such as higher molecular weight epoxy resins and the corresponding chlorohydrins. When viscous DEBA of this nature is employed in formulations wherein it is desirable to produce compositions with certain predetermined properties, the impurities interfere with the reaction of the available epoxy groups and thereby reduce the properties sought in the finished composition.

It is an object of the present invention to provide crystalline diglycidyl ether of bisphenol A. Another object is to provide a stable, free-flowing solid, heat-curable molding composition including crystalline diglycidyl ether of bisphenol A which composition will be characterized by a long shelf-life and, upon curing, by a high heat-distortion temperature. Other objects will become apparent from the following description.

According to the present invention, crude DEBA is dissolved in a hot solvent and thereafter the solution is cooled to obtain the crystals. The crude DEBA goes into solution over a temperature range of about 20 to 100° C. When the temperature of the hot solution is lowered to within the range of about 0 to 10° C., the DEBA appears as a separate layer. This layer, which is oily in appearance, can then be separated from the solvent and further cooled to obtain colorless crystals of DEBA. If the oil layer is not separated from the solvent and the cooling is continued, crystals of DEBA will form but the crystals will be colored and of lower purity. Of the two methods, we prefer to employ what is actually a combination in that the crude DEBA is dissolved in a solvent and the solution is slowly cooled. When the oil layer appears, cooling is stopped and the oil layer is removed and dissolved in a fresh portion of solvent. This solution is then cooled until the crystals of DEBA are obtained. Thus, by the preferred method, two steps in the operation give the desired crystalline DEBA having an epoxy content of 24.4 to 25.3% and a melting point in the range from 39 to 43° C.

The solvent must be a compound in which the DEBA will dissolve and from which the DEBA will crystallize when the temperature is lowered. It has been found that aliphatic alcohols containing from 1 to 4 carbon atoms are exceptionally good as solvents. Representative aliphatic alcohols of this nature are methanol, ethanol, 1-propanol, 2-propanol, 1-butanol, 2-butanol, and 2-methyl-1-propanol. However, it is not to be assumed that any organic solvent in which DEBA is soluble will function within the scope of this invention. For example, when acetone was employed as a solvent in the above procedure, the DEBA went into solution but upon cooling, even to a temperature as low as −15° C., crystals did not appear. Other compounds which are unsuitable as crystallization solvents are hydrocarbons such as hexane and ketones such as methylethyl ketone.

The crystalline DEBA of the present invention, when compounded with a curing agent, produces compositions which are valuable for use in the manufacture of varnishes, molding compositions, adhesives, films, fibers, molded articles, etc. In particular, the crystalline DEBA can be used to prepare free-flowing solid heat-curable molding compositions which are characterized by an exceptionally long shelf-life and, upon curing, by a high heat-distortion temperature. By shelf-life, it is meant that the molding compositions will not set or cure at room temperature. Heat-distortion temperature (HDT) is one characteristic which has been found useful in evaluating cured epoxies and it is largely dependent on the choice of curing agents. In general, HDT serves to indicate the approximate temperature below which most properties of a cured epoxy resin can be expected to be fairly stable. The HDT, ASTM D648–55T, is defined as that temperature at which a cured stock of definite dimensions deforms exactly 10 mils under a definite fiber stress when immersed in an oil bath with a temperature rise of 2° C. per minute.

One factor that arises in compounding epoxy resin molding compositions is the batch-to-batch variability in the epoxy resin (diglycidyl ether) itself. Such items as epoxide equivalent, hydroxyl equivalent, chlorine content, and reactive diluent content (generally monoepoxides) are some of the variables. The crystalline DEBA of the present invention will always have an epoxy content of at least 24.4% and a melting point at least 39° C.

The molding compositions according to the present invention comprise crystalline DEBA having a melting point in the range of from 39 to 43° C. and a solid epoxy resin curing agent. The solid epoxy resin curing agent may be selected from the so-called "hot-setting" curing agents, which include acid anhydrides and aromatic primary amines, and latent catalysts which are inactive at room temperature but decompose into active components when heated. Representative compounds of the acid anhydrides include phthalic anhydride, maleic anhydride, pyromellitic anhydride, dodecylsuccinic anhydride, hexahydrophthalic anhydride, and chlorendic anhydride. Representative compounds of the aromatic primary amines include m-phenylenediamine, 4,4'-methylenedianiline, and diaminodiphenyl sulfone. Latent catalysts include dimethylaminomethylphenol, tris - (dimethylaminomethyl)phenol, the 2-ethylhexoic acid salt of tris-(dimethylaminomethyl) phenol, benzyldimethylamine, and dicyandiamide. Further, boron trifluoride complexes may be included in the molding compositions where desirable to increase the cure polymerization time.

When the crystalline DEBA and the solid curing agent are combined in equivalent amounts, the cured material will exhibit the best combination of strength properties. However, the equivalents of curing agent may vary from as high as 1.2 equivalents of curing agent per equivalent of crystalline DEBA to as low as 0.80 equivalent per equivalent since it is generally well known that even when the reactants are combined in the most favorable proportions none will be completely utilized. This can be attributed to the fact that once the mixture has begun to react, it becomes more and more difficult for the remaining amino hydrogen and epoxide groups to come into contact. That is, as the molecular structure builds, they become locked in and immobilized.

When the crystalline DEBA of the present invention is combined in the aforesaid ratios with a curing agent of the type specified above, it will have a HDT from about 11° to 40° C. higher than the commercially available cured liquid DEBA. Since it is well known that the HDT of cured resins depends greatly upon the curing agent employed, comparisons between the HDT of the cured crystalline material and the cured liquid material must necessarily be taken from data wherein a common curing agent was employed. This is shown more clearly in Table I. Methylenedianiline in the same equivalent ratio was used as the curing agent in all the experiments.

TABLE I

| Epoxy resin: | HDT, °F. |
|---|---|
| Epon 828 Shell Chemical Company | 314 |
| Epon 820 Shell Chemical Company | 290 |
| Epon 815 Shell Chemical Company | 240 |
| ERL 2795 Bakelite Company | 237 |
| ERL 2774 Bakelite Company | 299 |
| 270-26-A The Dow Chemical Company | 323 |
| Crystalline DEBA | 344 |

If desirable, there is a variety of inert solid additives which may be incorporated into the molding composition in order to improve the properties of the cured resin for certain specific applications. These additives are broadly classified as reinforcements, fillers, thixotropic agents and colorants.

The following examples serve to illustrate the practice of the present invention.

*Example 1*

The material employed to produce crystalline DEBA was a liquid DEBA, hereinafter called crude DEBA, obtained by falling-film high vacuum distillation of the reaction product of bisphenol A with a large excess of epichlorohydrin and an equivalent (to the bisphenol A) quantity of solid sodium hydroxide. The material had the following properties:

Epoxy content by pyridine hydrochloride method=23.9% as $C_2H_3O$
Total chlorine=0.47%
Brookfield viscosity=4,365 stokes On long standing at room temperature the product exhibited a tendency to form a sticky semi-solid having a melting point of 32–38° C.

A solution of 10 grams of the crude DEBA in about 20 ml. of methanol was prepared by warming the two together at a temperature of about 45° C. After cooling at a temperature in the range of from 0 to 5° C. for a period of approximately 30 minutes, crystals formed which were filtered and dried. Melting point=42–43° C. Epoxy Content=24.7%.

*Example 2*

The same procedure was employed as in Example 1 with the exception that 20 ml. of n-propyl alcohol were used. Melting point=42–43° C. Epoxy content= 25.0%.

*Example 3*

The same procedure was employed as in Example 1 with the exception that 20 ml. of n-butyl alcohol were used. Melting point=40–41° C. Epoxy content= 24.4%.

*Example 4*

A solution of 300 grams of crude DEBA in 294 ml. of ethanol was prepared by warming the two together at a temperature of about 50° C. After cooling at a temperature in the range of from 0 to 5° for a period of approximately 30 minutes, 267 grams (89% recovery) of crystalline DEBA were obtained. This product had a melting point range of 38–42° C. and an epoxy content of 23.9%. A second solution was prepared by warming 150 grams of the above DEBA crystals in 750 ml. of ethanol at a temperature of about 50° C. This solution was then cooled at a temperature of 0–5° for a period of approximately 30 minutes and 123 grams (82% recovery) of crystalline DEBA were obtained. This product had a melting point range of 40–43° and an epoxy content of 25.3%. The total recovery of crystalline DEBA, based on the original 300 grams of crude DEBA starting material was 63%.

*Example 5*

Since, when an alcoholic solution of crude epoxy resin is cooled, an oily layer separates from the solvent before crystals form, it was found that the cooling could be stopped at this point and the oily layer redissolved in fresh solvent. By this procedure the desired product was obtained in two steps with the percent recovery being higher.

A solution of 75 grams of crude DEBA in 250 ml. of ethanol was prepared by warming the two together at a temperature of about 50° C. The solution was then cooled to about 3°, at which temperature the DEBA appeared as an oily layer. Cooling was stopped, the oily layer was separated from the solvent and redissolved by warming in an equal volume of fresh ethanol. This second solution was cooled at a temperature in the range of from 0–5° C. for a period of approximately 30 minutes. The white crystalline DEBA which had formed was filtered, washed with cold ethanol, and dried. This product had a melting point range of 42–43° C. and an epoxy content of 25.3%.

*Example 6*

A solid, free-flowing molding composition was prepared in the following manner. The crystalline DEBA employed was prepared according to Example 5 and had a melting point range of 42 to 43° C. and an epoxy content of 25.3%. Operating at room temperature, 100 grams of crystalline DEBA was powdered and mixed with an equivalent amount (29 grams) of 4,4'-methylenedianiline (MDA). This molding composition has the following properties:

(1) Dry powder which melts at about 80° C.
(2) Shelf life, no change after 1½ years.
(3) Heat-distortion temperature (after reaction), 344° F.

The above molding composition was readily cured by heating at 165° C. for 4.5 hours.

*Example 7*

A solid free-flowing molding composition was prepared in the following manner. The crystalline DEBA employed was prepared according to Example 5 and had a melting point range of 42 to 43° C. and an epoxy content of 25.3%. Operating at room temperature, 100 parts of crystalline DEBA was powdered and mixed with 110 parts of chlorendic anhydride and 6 drops of ethanolamine. This molding composition melted at about 130° C. and upon curing for 8 hours at 180° C., had a HDT of 381° F.

We claim:
1. A process for making monomeric diglycidyl ether of bisphenol A having a melting point of at least about 39° C. and an epoxy content of at least about 24.4% comprising the steps of dissolving crude diglycidyl ether of bisphenol A having a melting point below about 39° C. and an epoxy content below about 24.4% in a lower alkanol, cooling the resulting solution until a substantial portion of the ether separates in liquid form from the solution, separating this portion from the solution, redissolving said portion in fresh solvent, cooling the thus formed second solution until crystals of monomeric diglycidyl ether of bisphenol A are formed and separating said crystals from the said second solution.

2. A process as defined in claim 1 wherein the solvent is methanol.

3. A process as defined in claim 1 wherein the solvent is ethanol.

4. A process as defined in claim 1 wherein the solvent is propanol.

5. A process as defined in claim 1 wherein the solvent is butanol.

6. A process as defined in claim 1 wherein the temperature at which the ether is dissolved is about 40–100° C.

7. A process as defined in claim 1 wherein the temperature to which the solution is cooled is about 0–10° C.

References Cited in the file of this patent

UNITED STATES PATENTS

| | | |
|---|---|---|
| 2,467,171 | Werner et al. | Apr. 12, 1949 |
| 2,506,486 | Bender et al. | May 2, 1950 |
| 2,765,322 | Beavers | Oct. 2, 1956 |
| 2,794,754 | Schroeder | July 4, 1957 |
| 2,921,923 | Bruin et al. | Jan. 19, 1960 |

OTHER REFERENCES

Morton: "Laboratory Technique in Organic Chemistry," pages 147–165 (only pp. 147–150 and 159–163 presently relied upon), 1938, McGraw-Hill Publishers, New York, New York.

Weissberger: Technique of Organic Chem., vol. III (1950), pp. 363–485.

Dearborn et al.: Industrial and Engineering Chemistry, vol. 45, pp. 2715–21, (pages 2715–2717 relied on) (December 1953).